US008886924B1

(12) United States Patent
Ly et al.

(10) Patent No.: US 8,886,924 B1
(45) Date of Patent: Nov. 11, 2014

(54) SYSTEM AND METHOD FOR TRANSMITTING AN ALERT

(75) Inventors: Sidney Ly, Seattle, WA (US); Laurance N. Hazlehurst, Seattle, WA (US); Bruce S. Howard, Bellevue, WA (US); Ali Salour, Fenton, MO (US); Anh-Thu N. Thai, Seattle, WA (US); Karl L. Johnson, Seattle, WA (US); Jai J. Choi, Sammamish, WA (US); Chen-En Chen, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 378 days.

(21) Appl. No.: 13/297,226

(22) Filed: Nov. 15, 2011

(51) Int. Cl.
*H04L 29/06* (2006.01)

(52) U.S. Cl.
USPC .......................................................... 713/150

(58) Field of Classification Search
CPC .............. H04L 12/40104; H04L 51/00; G06F 2212/402
USPC .......................................................... 713/150
See application file for complete search history.

(56) References Cited

U.S. PATENT DOCUMENTS

| 7,953,846 | B1* | 5/2011 | Amoroso et al. ............. 709/224 |
| 2004/0068649 | A1* | 4/2004 | Haller et al. .................. 713/153 |
| 2008/0046510 | A1* | 2/2008 | Beauchamp et al. ......... 709/204 |
| 2008/0079597 | A1* | 4/2008 | Tambascio et al. ........... 340/679 |
| 2008/0211656 | A1* | 9/2008 | Binning ........................ 340/500 |
| 2009/0174566 | A1* | 7/2009 | Volk et al. .................. 340/691.5 |
| 2011/0170685 | A1* | 7/2011 | Benteo et al. ................... 380/28 |

OTHER PUBLICATIONS

Wikkipedia, "Andon System," available at <http://en.wikipedia.org/wiki/Andon_(manufacturing)>, last visited Nov. 6, 2011.

* cited by examiner

*Primary Examiner* — Kambiz Zand
*Assistant Examiner* — Ali Shayanfar

(57) ABSTRACT

An alert system may include an alert sender module, an alert routing module, an alert controller module, and an alert mechanism. The alert sender module may be configured to send an encrypted alert independent of an internet security firewall. The alert routing module may have a registry and may be configured to receive the encrypted alert and process the encrypted alert according to a security mechanism associated with the registry. The alert controller module may be configured to accept the encrypted alert from the alert routing module according to the security mechanism. The alert mechanism may be configured to be activated by the alert controller module.

18 Claims, 9 Drawing Sheets

SYSTEM AND METHOD FOR TRANSMITTING AN ALERT

FIELD

The present disclosure relates generally to alert systems and, more particularly, to a system and method for secure transmission of alert messages using standard communication protocols.

BACKGROUND

On many production programs, the ability to resolve production issues or address manufacturing events in a timely manner is necessary for meeting production schedules. The ability to rapidly resolve a production issue may be dependent on the ability to quickly notify the appropriate personnel of the production issue. For a production program where manufacturing and support operations are located within a single facility, the amount of time required to alert the appropriate personnel may be relatively short. However, many manufacturers of large programs are outsourcing an increasing amount of manufacturing and production work to a variety of different facilities at numerous locations including overseas locations. The increase in outsourcing may result in an increase in the amount of time required to notify appropriate personnel of the occurrence of a manufacturing event so that the event may be addressed and resolved.

Adding to the time required to resolve a production issue is the wide variety of communication systems that may exist at the different facilities. For example, each facility may have their own unique communication system with unique communication protocols and unique security requirements. Furthermore, each facility may have one or more internet security firewalls that block the receipt of messages from outside sources. The different communication protocols and security requirements may not be compatible with the protocols and security requirements of other facilities with the result that an alert that is sent from one facility may not be received by an intended recipient in another facility in a timely manner.

A further drawback associated with conventional communication systems is that a first facility working on a production program may not inform other facilities of changes that may have been implemented in the communication system at the first facility. For example, one facility may expand, upgrade, or alter their communication system without providing notice to other facilities of the changes to the communication system. As a result, personnel at one facility may not receive timely notice of a manufacturing event that may have occurred at another facility. The net result may be an increase in the amount of time required to address and resolve a manufacturing event.

As can be seen, there exists a need in the art for a system and method for sending an alert regarding an event to appropriate personnel and wherein the system may be operated without regard to security requirements such as firewalls that may be installed at different facilities. Furthermore, there exists a need in the art for a system and method for sending an alert which accommodates changes to the communication systems at each facility.

BRIEF SUMMARY

The above-noted needs associated with communication of manufacturing events are specifically addressed and alleviated by the present disclosure which, in an embodiment, provides an alert system that may include an alert sender module, an alert routing module, an alert controller module, and an alert mechanism. The alert sender module may be configured to send an encrypted alert independent of an internet security firewall. The alert routing module may have a registry and may be configured to receive the encrypted alert and process the encrypted alert according to a security mechanism associated with the registry. The alert controller module may be configured to accept the encrypted alert from the alert routing module according to the security mechanism. The alert mechanism may be configured to be activated by the alert controller module.

In a further embodiment, disclosed is an alert system which may include an alert sender module, an alert routing module, an alert controller module, and an alert mechanism. The alert sender module may be configured to send an encrypted alert independent of an internet security firewall. The alert routing module may have a registry. The alert controller module may be communicatively coupled to the alert routing module. The alert mechanism may be communicatively coupled to the alert controller module. The registry may be configured to issue an encryption key to the alert controller module upon registration thereof with the registry. The alert controller module may be configured to accept the encrypted alert if the encrypted alert is capable of being decrypted using the encryption key. The alert mechanism may be configured to be activated by the alert controller module upon decryption of the encrypted alert.

Also disclosed is a method of sending an alert which may include sending an encrypted alert independent of a presence of an internet security firewall. The method may also include processing the encrypted alert according to a security mechanism associated with a registry. In addition, the method may include accepting the encrypted alert from the alert routing module according to the security mechanism. The method may also include the step of activating an alert mechanism in response to accepting the encrypted alert from the alert routing module.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
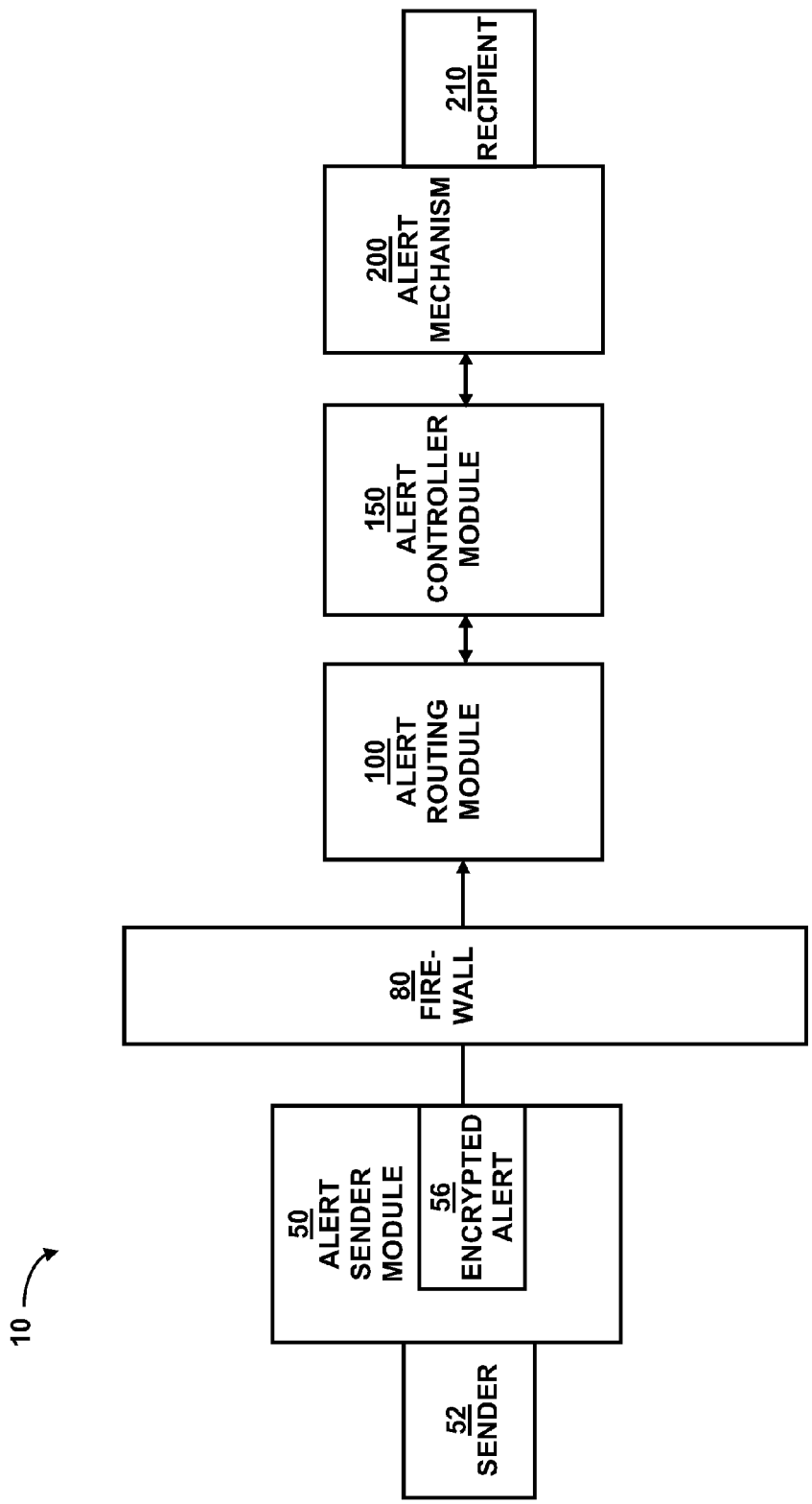
FIG. 1 is a schematic diagram of an alert system having an alert sender module, an alert routing module, an alert controller module, and an alert mechanism.
Figure 2:
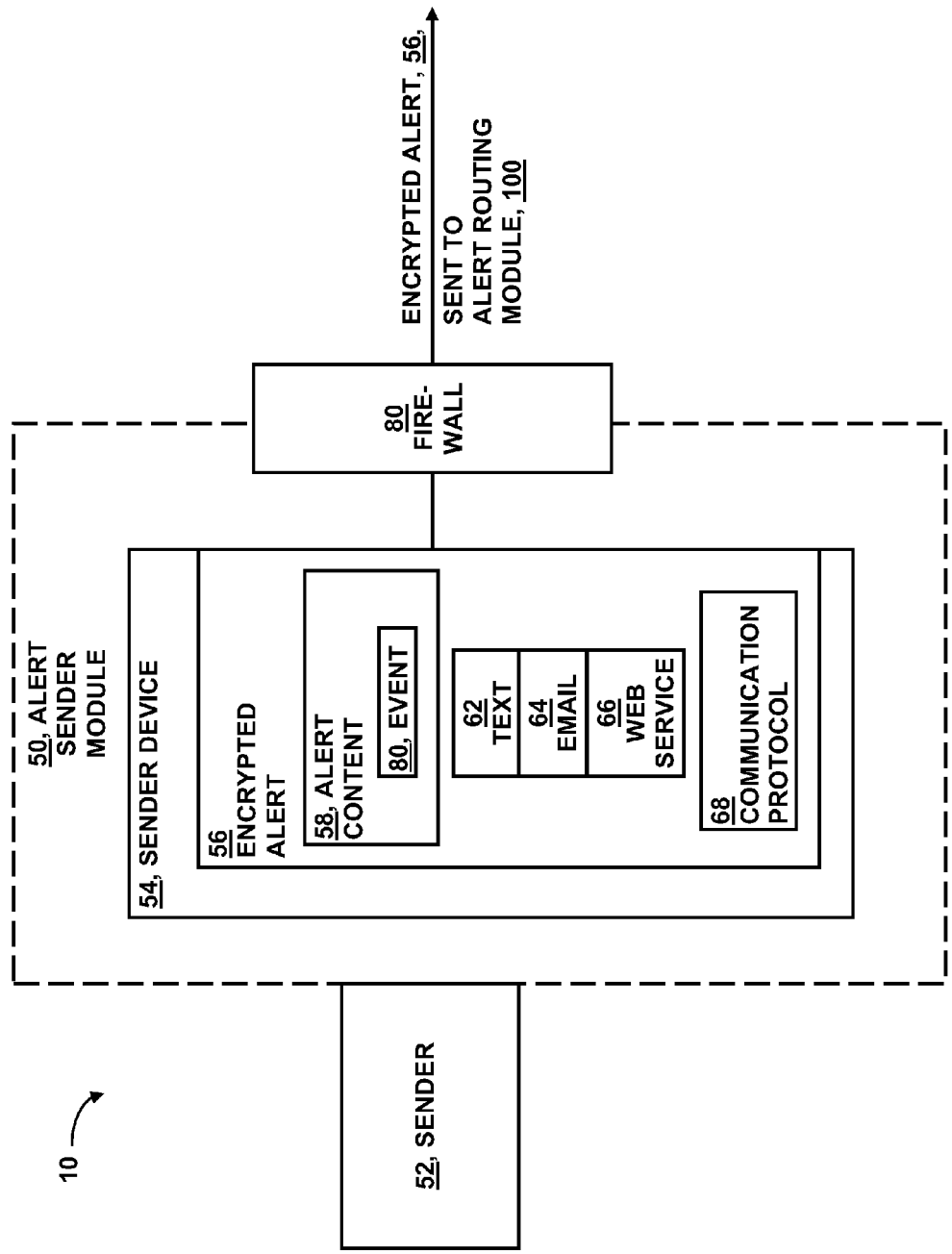
FIG. 2 is a schematic diagram of one or more components of the alert sender module and the interconnectivity thereof to the alert routing module.

Referring now to the drawings wherein the showings are for purposes of illustrating various embodiments of the disclosure, shown in FIG. 1 is a schematic diagram of an alert system 10 for sending an alert 56 or message from a sender 52 to a recipient 210 to alert the recipient 210 of an event 60 (FIG. 2). Advantageously, the system 10 is configured to facilitate the sending of the alert 56 in a secure manner as an encrypted alert 56. Furthermore, the system 10 is configured to facilitate the sending of the encrypted alert 56 independent of a presence of an internet security firewall 80. The system 10 is configured to facilitate the sending of the encrypted alert 56 using standard communication protocols 68 (FIG. 2) including, but not limited to, text messages 62 (FIG. 2), emails 64 (FIG. 2), and web service 66 (FIG. 2) communications.

Figure 3:
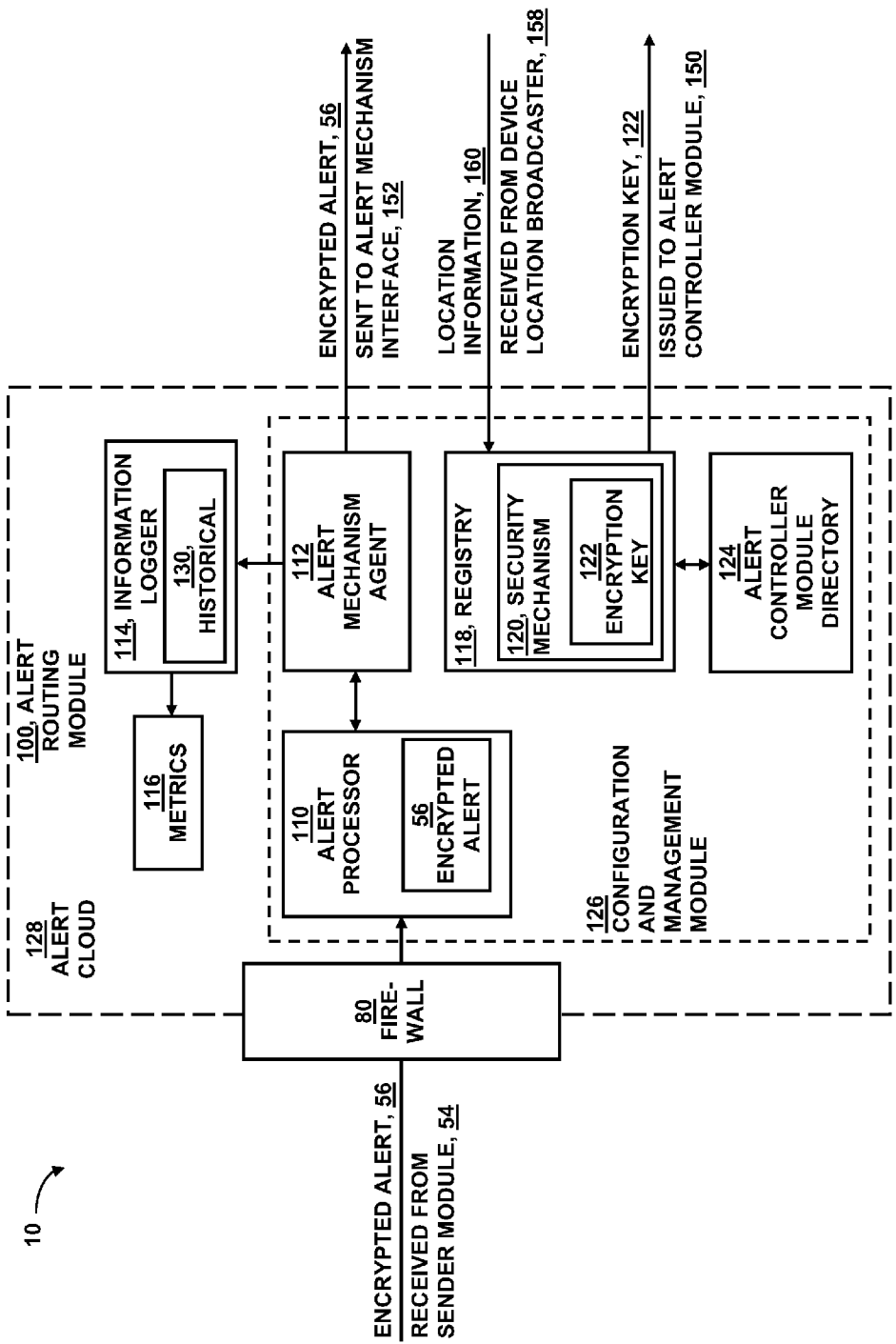
FIG. 3 is a schematic diagram of one or more components of the alert routing module and the interconnectivity thereof to the alert sender module and the alert controller module.

As shown in FIG. 1, the system 10 may include an alert sender module 50 for sending one or more encrypted alerts 56 to an alert routing module 100 across an internet security firewall 80. The alert routing module 100 may receive and process the encrypted alert 56 using a security mechanism 120 (FIG. 3) for secure transmission of the encrypted alert 56. The system 10 may include one or more alert controller modules 150 that may be configured to accept the encrypted alert 56 from the alert routing module 100 according to the security mechanism 120. In an embodiment, the security mechanism 120 may comprise an encryption key 122 (FIG. 3) that may be issued by the alert routing module 100 to the alert controller module 150 when the alert controller module 150 registers with the alert routing module 100 as described below. The alert controller module 150 may be limited to accepting encrypted alerts 56 that are capable of being decrypted using the encryption key 122 (FIG. 3). In this manner, the alert routing module 100 may limit access to the alert controller module 150 to prevent the receipt of messages (not shown) from unauthorized senders (not shown).

Referring still to FIG. 1, upon acceptance of the encrypted alert 56, the alert routing module 100 may be further configured to activate and/or control an alert mechanism 200 to alert a recipient 210 of the alert 56. For example, the alert 56 may be sent to notify a recipient 210 of the occurrence of an event 60 (FIG. 2) such as a manufacturing event (not shown). However, the 56 may be sent to notify the recipient 210 of the occurrence of any one of a variety of different types of events 60, without limitation, and is not limited to notifying the recipient 210 of the occurrence of a manufacturing event.

Advantageously, the system 10 in FIG. 1 is arranged such that the alert sender module 50, the alert routing module 100, the alert controller module 150, and the alert mechanism 200 are provided in four distinct modules 50, 100, 150, 200 communicatively coupled to one another in series. Each one of the modules 50, 100, 150, 200 may perform a unique set of operations independent of the other modules within the system 10. As described below, an alert 56 can be sent from the alert sender module 50 to the alert routing module 100, from the alert routing module 100 to the alert controller module 150, and from the alert controller module 150 to the alert mechanism 200. The alert 56 can be sent using a means of communication or communication protocol 68 (FIG. 2) that is not limited or restricted by internet security firewalls 80 (FIG. 1). For example, The alert 56 can be sent by email 64, text message 62 (FIG. 2), web service 66 (FIG. 2) communication, or any other communication protocol 68 that is not restricted by an internet security firewall 80.

Referring to FIG. 2, shown is the alert sender module 50. The alert sender module 50 may include one or more sender devices 54. Each one of the sender devices 54 may be configured to send an encrypted alert 56 initiated by a sender 52. The encrypted alert 56 may be manually generated in response to the occurrence of an event 60 such as a manufacturing event (not shown) associated with a manufacturing operation (not shown) in a manufacturing facility (not shown). Alternatively, the alert 56 may be initiated or generated autonomously by a machine (not shown) such as a machine associated with or operating within a manufacturing facility. The machine may autonomously generate the alert 56 in response to a manufacturing event. The sender device 54 may encrypt the alert 56 for sending the alert 56 over the internet (not shown) as described below.

In FIG. 2, the alert sender module 50 (FIG. 2) may advantageously be configured to send the encrypted alert 56 using a communication protocol 68 that is not subject to restrictions associated with one or more internet security firewalls 80. In this regard, the alert routing module 100 (FIG. 3) may receive the encrypted alert 56 from the sender device 54 regardless of the presence of the internet security firewall 80. In an embodiment, the alert 56 may be generated with the aid of an application (e.g., an application programming interface—not shown) that may operate on the sender device 54 (FIG. 2) and which may be configured to facilitate the generation and transmission of the encrypted alert 56. The sender device 54 may be configured to send the encrypted alert 56 using the communication protocol 68 that is not subject to firewall 80 restrictions such as email 64 (FIG. 2), text messaging 62 (FIG. 2), web service 66 (FIG. 2) communication, or other communication protocols 68 not subject to firewall 80 restrictions. In an embodiment, the sender device 54 may also be configured to send the alert 56 over a virtual private network (VPN) (not shown) not subject to internet security firewall 80 restrictions for transmitting the alert 56 from the sender device 54 to the alert routing module 100.

The sender device 54 may be configured as any type of device, without limitation, capable of sending the encrypted alert 56 using a communication protocol 68 not subject to firewall 80 restrictions. In this regard, the sender device 54 may be configured as any communication device including a portable communication device (not shown) such as a cellular telephone, a smart telephone having internet access capability, or other portable communication devices. The sender device 54 may also be configured as a personal computer (not shown), a portable computer (not shown), or any standalone computing system (not shown) or generally stationary computing system (not shown) capable of sending an encrypted alert 56 using one or more communication protocols 68 not subject to restrictions associated with one or more internet security firewalls 80. In an embodiment, the sender device 54 is not limited to a communication device. For example, the sender device 54 may be coupled to, associated with, or integrated into a machine, an assembly, a subassembly, a system, a structure, and/or infrastructure. For example, the sender device 54 may be associated with a machine or process in a facility such as a manufacturing facility.

For example, in a non-limiting illustration of the functionality of the sender module 50 (FIG. 2), the sender device 54 (FIG. 2) may be coupled to a numerical control (NC) machine (not shown) configured to perform machining operations on a component (not shown) within a manufacturing facility (not shown). Upon the occurrence of a manufacturing event associated with the machining of the component such as a non-conformance (not shown) in the component geometry, the alert sender module 50 may be configured to generate an alert 56 (FIG. 2) representative of the non-conformance. In an embodiment, the alert 56 may include alert content 58 (FIG. 2) comprising information regarding the nature of the non-conformance such that a recipient 210 (FIG. 1) of the alert 56 may review the non-conformance information (not shown) and determine if corrective action is required.

Figure 4:
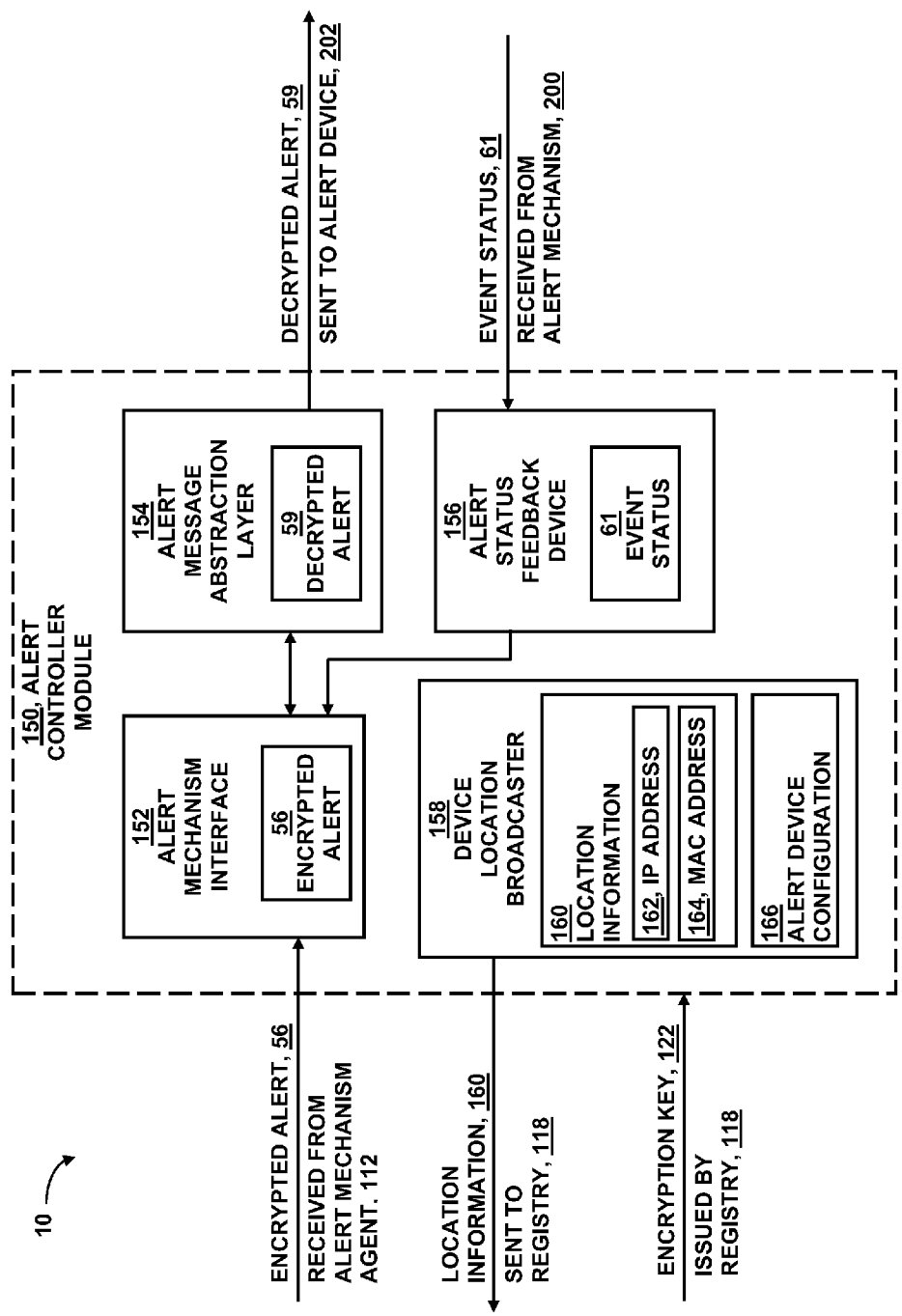
FIG. 4 is a schematic diagram of one or more components of the alert controller module and the interconnectivity thereof to the alert routing module and the alert mechanism.

In an embodiment, the system 10 (FIG. 2) may be configured to process input from one or more sensors (not shown) that may be associated with one or more machines (not shown) or processes (not shown). For example, sensors may be configured to provide environmental data (not shown) and/or operating data (not shown) of the machine or process such that the environmental data and/or operating data may be transmitted with the alert 56 (FIG. 2). Such environmental data or operating data may include any type of environmental or operating data, without limitation, such as temperature and humidity data of an operating environment of a machine or process. For example, a machine may include a temperature sensor (not shown) that may be hardwired or wirelessly coupled to an alert sender module 50 (FIG. 2) and/or to the alert controller module 150 (FIG. 4). When the operating environment (not shown) reaches a predetermined temperature (not shown) and/or when the machine (not shown) reaches a predetermined temperature, the alert sender module 50 (FIG. 2) may send an alert 56 (FIG. 2) so that one or more alert devices 202 (FIG. 5) may be activated to notify one or more intended recipients 210 (FIG. 5) of the temperature of the environment or machine so that the machine can be adjusted or deactivated (i.e., shut down or turned off) to avoid damage to the machine. The alert controller module 150 may also be configured to automatically adjust or deactivate the machine automatically such as according to preprogrammed instructions (not shown).

In addition to temperature sensors, other sensors (not shown) may also be coupled to the alert sender module 50 (FIG. 2) to provide other types of information (not shown) regarding a machine or process. For example, accelerometers (not shown) may be included on a machine to measure acceleration or shock to which a machine may be subjected. Such information may be included in the alert content 58 (FIG. 2) along with a preprogrammed message (not shown) to notify a recipient 210 (FIG. 1) of the status of the machine. In the case of a mobile process (not shown) or a mobile machine (not shown) such as a vehicle operating within a facility or outside of a facility, sensors may provide information that may be included in an alert 56 (FIG. 2) regarding acceleration, speed, positional data (not shown) such as Global Positioning System (GPS) data, and/or other data that may be associated with the operation or movement of the vehicle.

Figure 5:
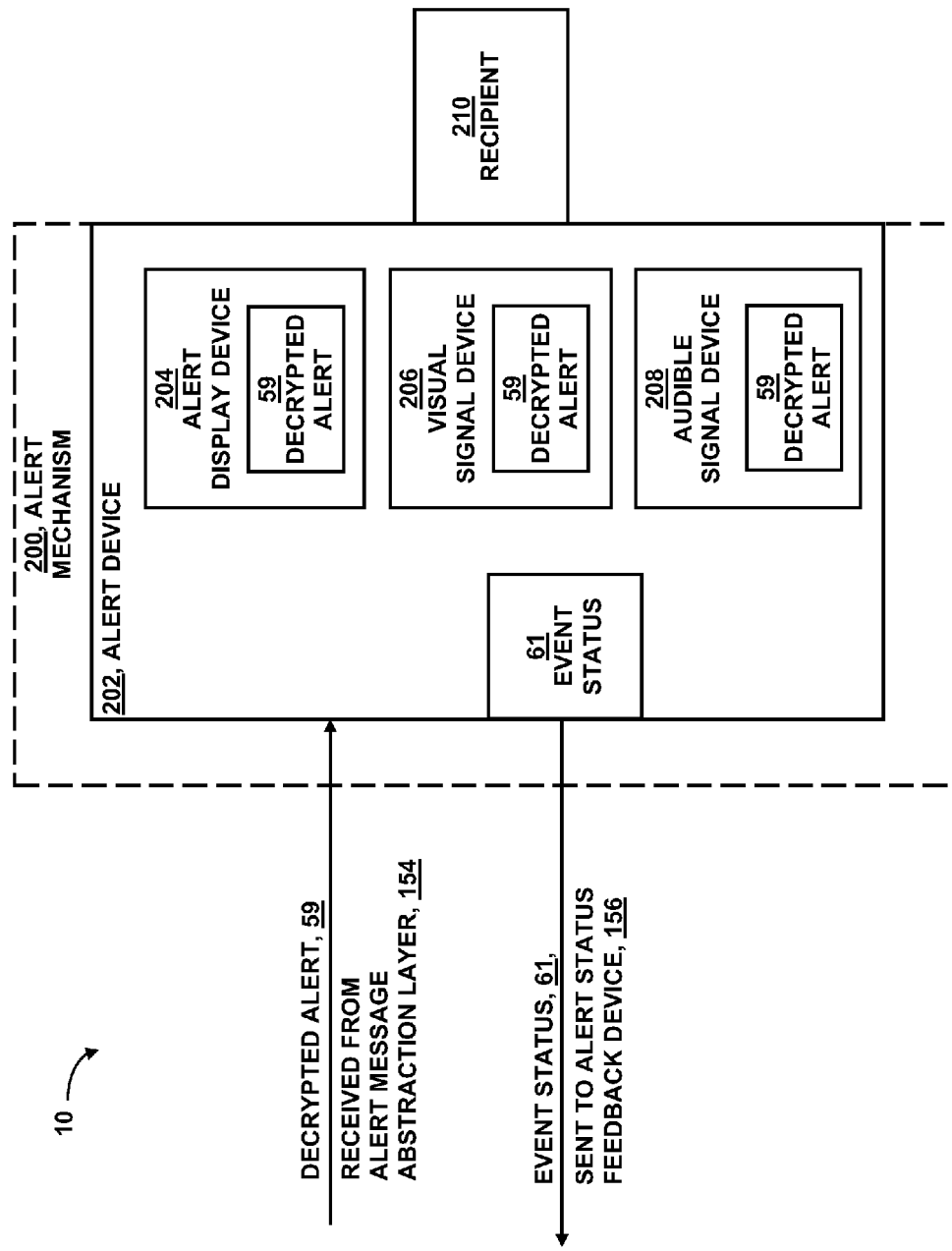
FIG. 5 is a schematic diagram of one or more alert devices of the alert mechanism and the interconnectivity of the alert mechanism to the alert controller module.

The alert 56 (FIG. 2) may be intended for receipt by a recipient 210 (FIG. 5). The recipient 210 may be located in the same facility or in a different facility than the location of the area where the alert 56 originated. The encrypted alert 56 may include the alert content 58 that may indicate the nature of the event 80. Upon receiving the alert 56, the recipient 210 (FIG. 5) may take appropriate action.

Referring to FIG. 3, shown is the alert routing module 100 which may include an alert processer 110 for receiving the encrypted alert 56 from the alert sender module 50 (FIG. 2). The alert processor 110 may form part of a configuration and management module 126 of the alert routing module 100 for controlling access to the alert controller module 150. The alert processor 110 may be configured to receive the encrypted alert 56 from the alert sender module 50 and pass the alert 56 to an alert mechanism agent 112. The configuration and management module 126 of the alert routing module 100 may further include a registry 118 and an alert controller module directory 124. The alert controller module directory 124 may contain a listing of alert controller modules 150 located at one or more locations (not shown).

Each alert controller module 150 may be added to the alert controller module directory 124 upon the registration of each alert controller module 150 with the registry 118. During registration of each alert controller module 150, location information 160 for the alert controller module 150 may be received from a device location broadcaster 158 as described in greater detail below. In this regard, the alert routing module 100 may function as a centralized alert cloud 128 for registering a plurality of alert controller modules 150 (FIG. 4) that may be located at any one of a variety of local, national, and international locations (not shown). The registry 118 may include a security mechanism 120. The security mechanism 120 may comprise one or more encryption keys 122. Each one of the encryption keys 122 may be issued to a corresponding one of the alert controller modules 150.

Upon the alert processor 110 receiving the encrypted alert 56 from the alert sender module 50 (FIG. 2), the alert routing module 100 may be configured to scan the registry 118 and request access to at least one available alert controller module 150 listed in the alert controller module directory 124. As part of the security mechanism 120, the alert routing module 100 may assign or issue an encryption key 122 to an available alert controller module 150 upon scanning the registry 118. The alert routing module 100 may select the alert controller module 150 from those listed in the alert controller module directory 124 based upon the intended recipient 210 (FIG. 1). The recipient 210 may be determined by the sender 52 (FIG. 2) during generation of the encrypted alert 56 at the sender device 54 (FIG. 2). The alert routing module 100 may also select the alert controller module 150 from those listed in the alert controller module directory 124 based upon the alert content 58 (FIG. 2) (e.g., the nature of the manufacturing event—not shown) and/or based upon the location of the sender module 50 from which the encrypted alert 56 may be sent. As described below, the encryption key 122 may facilitate decryption of the encrypted alert 56.

Referring still to FIG. 3, the alert mechanism agent 112 may receive the encrypted alerts 56 from the alert processor 110. An information logger 114 may be connected to the alert mechanism agent 112 for logging historical data 130 associated with a plurality of the encrypted alerts 56 (FIG. 2) received and processed by the alert routing module 100. The information logger 114 may store alert content 58 (FIG. 2) of the plurality of encrypted alerts 56 and other data (not shown) associated with the encrypted alerts 56 such as date and time that the encrypted alert 56 was generated, location of the sender device 54 from which the encrypted alert 56 was sent, and other information.

The information logger 114 may generate metrics 116 for analysis of the events 60 associated with the encrypted alerts 56. The metrics 116 may be presented or analyzed to facilitate the detection of trends or anomalies. For example, the information logger 114 may log historical data 130 regarding a plurality of manufacturing events (not shown) that may be associated with a corresponding plurality of the encrypted alerts 56. The metrics 116 may reveal manufacturing issues (not shown) pertinent to a manufacturing event (not shown). In this regard, the metrics 116 may facilitate the generation of potential solutions (not shown) for resolving a manufacturing event. For example, the metrics 116 may provide potential solutions for adjusting, repairing, or reallocating manufacturing equipment (not shown) at a manufacturing facility (not shown) such as at a supplier site (not shown).

Referring to FIG. 4, shown is the alert controller module 150. The alert controller module 150 may include an alert mechanism interface 152 for receiving encrypted alerts 56 from the alert mechanism agent 112 of the alert routing module 100 (FIG. 3). The alert mechanism interface 152 may be configured to accept the encrypted alert 56 from the alert routing module 100 if the encrypted alert 56 is capable of being decrypted using the encryption key 122 (FIG. 3) issued to the alert controller module 150 by the registry 118 during registration of the alert controller module 150. As indicated above, the alert controller module 150 may be configured to register with the registry 118 such as upon booting up of the alert controller module 150 or at predetermined time intervals during operation of the alert controller module 150. In an embodiment, the encryption key 122 may be a public encryption key (not shown). However, alternative decryption means may be provided for decrypting the encrypted alert 56.

In FIG. 4, in an embodiment, the alert controller module 150 (i.e., the alert mechanism interface 152) may be configured to accept only encrypted alerts 56 having a communication protocol 68 (FIG. 2) that is not subject to restrictions associated with an internet security firewall 80 (FIG. 3). As indicated above, such communication protocols 68 may include email 64 (FIG. 2), text message 62 (FIG. 2), and web service 66 (FIG. 2) communication, or other communication protocols 68 not restricted by an internet security firewall 80. Advantageously, based on the security mechanism 120, transmission of the encrypted alerts 56 (i.e., from a sender 52, FIG. 1) to the alert controller module 150 may be limited to encrypted alerts 56 that are decryptable using the encryption key 122 (FIG. 3). Once the alert controller module 150 is issued an encryption key 122, the alert mechanism interface 152 may receive the encrypted alert 56 from the alert routing module 100.

The alert controller module 150 (FIG. 4) may include a device location broadcaster 158 as mentioned above. The device location broadcaster 158 may provide information to the registry 118 regarding the location information 160 of the alert controller module 150 and the alert mechanism 200 or alert devices 202 that may be supported by or linked to the alert controller module 150. For example, upon booting up of the alert controller module 150 or at predetermined time intervals during operation of the alert controller module 150, the device location broadcaster 158 may provide location information 160 to the alert routing module 100 regarding the location of the alert controller module 150 and the location 160 of one or more alert devices 202 that may be supported by or that are in communication with the alert controller module 150. The location information 160 may comprise an internet protocol (IP) numerical address 162 indicating the location of the alert controller module 150 and the alert devices 202 (not shown) included in the alert controller module 150-alert device 202 network (not shown) and that may operate under the internet protocol.

In FIG. 4, the location information 160 may also comprise media access control (MAC) address 164 information that may identify the alert controller module 150 and the alert devices 202 supported by the alert controller module 150. The device location broadcaster 158 may also optionally provide information to the registry 118 of the alert routing module 100 (FIG. 3) regarding the type or configuration 166 of the alert devices 202 supported by the alert routing controller 150. For example, the device location broadcaster 158 may provide information to the registry 118 regarding whether the alert devices 202 are capable of receiving email 64 (FIG. 2), text messages 62 (FIG. 2), and web service 66 (FIG. 2) communications. The device location broadcaster 158 may also optionally provide information to the registry 118 indicating if the alert device 202 is configured to transmit a visual alert (not shown), an audible signal (not shown), or other media (not shown) for notifying an intended recipient 210 (FIG. 5) of an alert 56 (FIG. 2).

The alert controller module 150 (FIG. 4) may be configured to determine a physical location of one or more of the alert devices 202 (FIG. 4) based on the IP address 162 and/or on the MAC address 164 during registration of the alert controller module 150. For example, the alert controller module 150 may link the IP address 162 or the MAC address 164 to the physical location of one or more alert devices 202 in a facility (not shown), a locale (not shown), or in another geographic location (not shown). In an embodiment, the alert controller module 150 may determine an x-y grid position (not shown) within a production facility (not shown), a manufacturing facility (not shown), and/or a site that may be linked to the IP address 162 and/or the MAC address 164 of a given alert device 202. The location information 160 may be available to a user of the system 10 such that the user may ascertain whether the alert 56 would be received by an alert device 202 located in an area near the intended recipients 210 (FIG. 5).

Referring still to FIG. 4, the alert mechanism interface 152 of the alert controller module 150 may be configured decrypt the encrypted message using the decryption key 122 issued to the alert controller module 150. The alert mechanism interface 152 may also activate or control one or more alert devices 202 that may be supported by the alert controller module 150. Advantageously, the alert controller module 150 may be configured to directly control one or more alert device 202 independent of the type or configuration of the alert device 202 and independent of the mode of operation of the alert device 202. For example, through the alert mechanism interface 152, the alert controller module 150 may be configured to activate and/or control one or more alert devices 202 having any one of a variety of different configurations 166 and operating modes. In this regard, the alert mechanism interface 152 may be configured to activate and/or control alert devices 202 configured to display text messages 62 (FIG. 2) or emails 64 (FIG. 2), alert devices 202 that emit visual signals (not shown) such as through a stack of lights, alert devices 202 that activate a speaker (not shown) to emit an audible signal (not shown), or other alert device configurations 166. Advantageously, the alert controller module 150 may control one or more alert devices 202 independent of the specific configuration of the alert devices 202.

The alert controller module 150 may include an alert message abstraction layer 154 for receiving the decrypted alert 59 and controlling, setting up, and/or managing the operating attributes (not shown) of the alert devices 202. For example, the alert message abstraction layer 154 may provide a means to select which lights (not shown) in a stacked tri-color light display (e.g., red, yellow, green—not shown) may be illuminated based upon the content 58 (FIG. 2) of the decrypted alert 59 as sent to the alert device 202 by the alert message abstraction layer 154. In the same manner, the alert message abstraction layer 154 may provide a means to control or set the manner in which a signal (not shown) is emitted by an alert device 202. For example, the alert message abstraction layer 154 may control the length of time or the manner in which a visual signal is displayed or an audible signal is sounded, and the manner in which text messages 62 (FIG. 2) and emails 64 (FIG. 2) may be displayed on a computer screen (not shown).

In FIG. 4, the alert controller module 150 may also include an alert status feedback device 156 configured to indicate the event status 61 or progress of an event 60 (FIG. 2) associated with a decrypted alert 59. For example, the alert status feedback device 156 may be configured to indicate the status of an event 60 (FIG. 2) associated with a decrypted alert 59 such as a manufacturing event. In addition, the alert status feedback device 156 may also be configured to accept data from one or more sensors (not shown) that may be associated with a machine (not shown) or process (not shown). As indicated above, the alert status feedback device 156 may be configured to provide continuous, intermittent, or on-demand updates (not shown) regarding the status of a machine (not shown) or process that may be the subject of a decrypted alert 59. For example, the alert status feedback device 156 may provide information regarding the temperature (not shown) of a machine (not shown) such that appropriate personnel (not shown) may monitor the status of the machine and determine if further action is required to resolve an event 60 (FIG. 2) associated with the machine or to determine if or when the machine may be reactivated.

In an embodiment, the alert controller module 150 may be configured to be set up, controlled, and/or managed by a web-based administration tool (not shown) version of the routing alert module 100 (FIG. 3). Likewise, one or more of the alert devices 202 may be set up or configured for operation by a web-based administration tool (not shown) version of the alert controller module 150. Such web-based administration tools may provide a means for configuring, activating, controlling, and/or managing settings, preferences, and features of the alert controller module 150 and/or the alert mechanism 200 (FIG. 4) and the alert devices 202.

Referring to FIG. 5, shown is an embodiment of the alert mechanism 200 which may comprise one or more alert devices 202. The alert devices may be configured to receive one or more decrypted alerts 59 from the alert message abstraction layer 154. The alert devices 202 may be activatable and/or controllable by the alert controller module 150 (FIG. 4). In this regard, the alert devices 202 may be configured to display the alerts 56 (FIG. 2) including displaying the alert content 58 (FIG. 2) of a decrypted alert 59. For example, an alert device 202 may comprise an alert display device 204 such as a computer (not shown) having a display configured to display the alert content 58 (FIG. 2) of an alert 59. The computer display may be configured to display a description of an event 60 (FIG. 2) that may have triggered the generation of the encrypted alert 56 (FIG. 2). The computer display may also be configured to display the location, time, and date of the occurrence of the event 60 (FIG. 2).

The alert devices 202 may be configured to communicate with the alert controller module 150 (FIG. 4) using a communication protocol 68 (FIG. 2) such as text message 62 (FIG. 2), email 64 (FIG. 2), and web service 66 (FIG. 2) as described above. In an embodiment, the alert device 202 may comprise a dashboard display (not shown) that may display pre-selected types of information associated with an alert 56 (FIG. 2) sent by a sender device 54 (FIG. 2). For example, the dashboard may be configured to display one or more operating parameters of a numerical control (NC) machine for which an alert 56 (FIG. 2) was generated. In this manner, the dashboard may provide a means to monitor one or more parameters associated with the operation of the NC machine. In an embodiment, the alert 59 may be configured to deactivate or stop the operation of the NC machine in addition to alerting a recipient 210 by means of activating one or more alert devices 202. For example, the operation of an NC machine may be stopped upon the detection of a non-conformance.

In a further embodiment, the alert device 202 (FIG. 5) may comprise a set of stacked lights (not shown) that may be hardwired (not shown) or wirelessly connected to the alert controller module 150 for activation and control. For example, the alert device 202 may comprise stacked lights (not shown) configured as tri-colored lights such as red-green-yellow lights that may be controlled by a digital output line (not shown) or wireless connection from the alert controller module 150 (FIG. 4) and wherein the illumination of one or more of the lights in the stack may indicate the nature of the event 60 associated with the alert 56. In a further embodiment, an alert device 202 may be configured as an audible signal device 208 such as a loudspeaker (not shown) for producing an audible signal or tones for alerting one or more intended recipients 210 of the occurrence of an event 60 (FIG. 2) such as a manufacturing event. The audible signals may be coded by means of emitting tones of a predetermined length or a predetermined pitch and which may correspond to a predetermined condition or event 60 (FIG. 2) such as an anomaly occurring in a machine, a system, or a process at a manufacturing location. Further in this regard, the alert device 202 may be configured to deactivate or halt the operation of a machine, a system, or a process upon the occurrence of an event 60 at one location when the event 60 may affect other facilities (not shown) in the same location or facilities in other locations.

The alert mechanism 202 may also be configured to send one or more event status 61 updates to the alert status feedback device 156 (FIG. 4), as described above, such that the progress of an event 60 (FIG. 2) associated with a decrypted alert 59 may be monitored. For example, the alert status feedback device 156 may be configured to receive continuous, intermittent, or on-demand updates (not shown) of an event status based on subsequent alerts 56 (FIG. 2) that may be generated at the sender module 50 (FIG. 2). As was also mentioned above, in an embodiment, the alert status feedback device 156 may accept data from sensors (not shown) that may be associated with a machine (not shown) or process (not shown).

Figure 6:
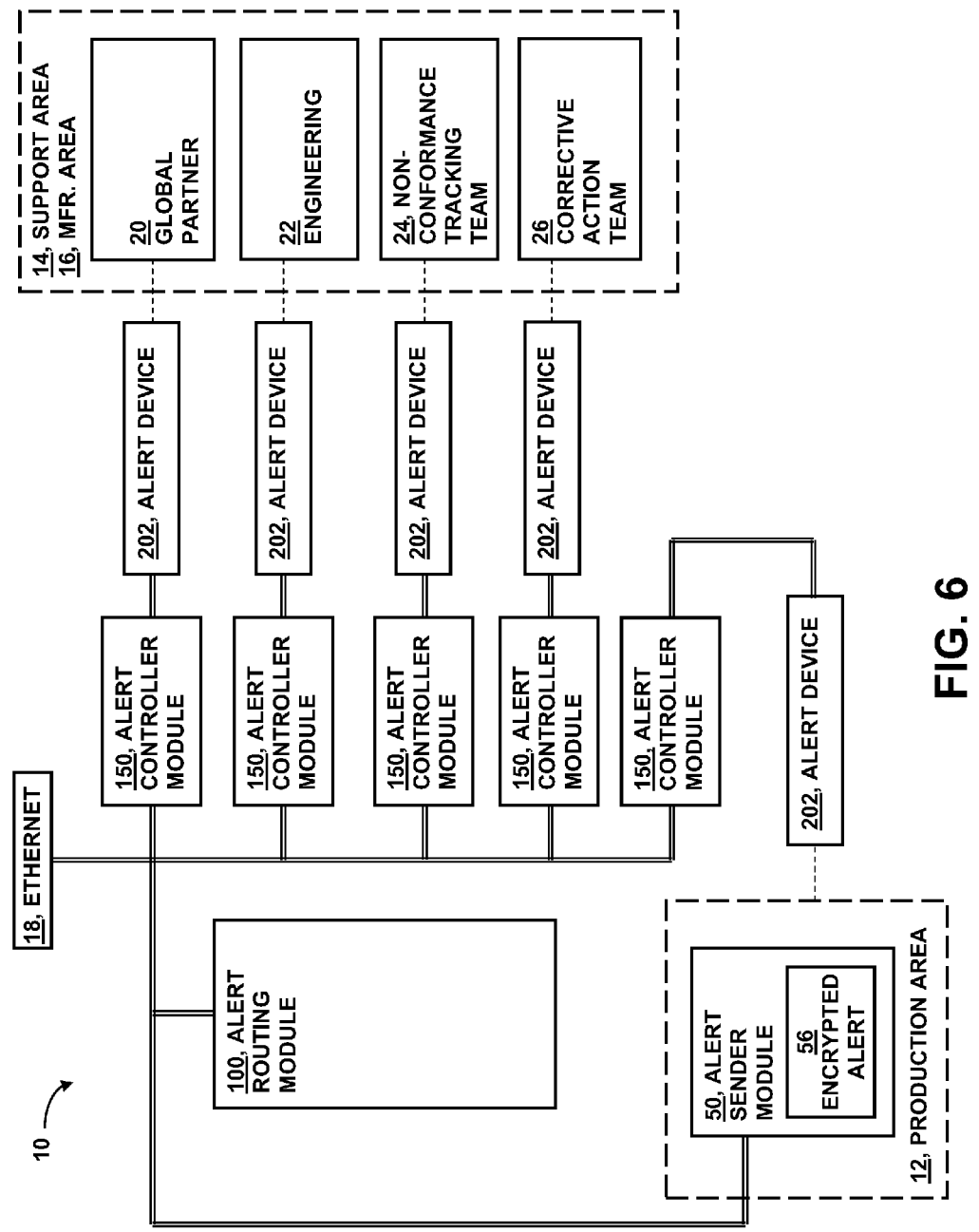
FIG. 6; is an illustration of an embodiment of the alert system implemented in a production environment.

Referring to FIG. 6, shown is an embodiment of the system 10 implemented in a production environment (not shown) having a production area 12. An alert sender module 50 may be used by personnel (not shown) working in the production environment to generate an alert 56 upon the occurrence of a manufacturing event (not shown). The alert sender module 50 may be coupled to the alert routing module 100 via an Ethernet 18 connection or other connection such as an internet (not shown) connection. The alert routing module 100 may be interconnected to a plurality of alert controller modules 150, each of which may be registered with a registry 118 (FIG. 7) of the alert controller module 150 upon bootup of each alert controller module 150 and or at predetermined time intervals during operation of the system 10.

The alert controller modules 150 may provide an indication of the location 160 (FIG. 7) of one or more alert devices 202 (FIG. 6) supported by each alert controller module 150. For example, an alert controller module 150 may be coupled to an alert device 202 that may be located in a support area 14 or a manufacturing area 16 for supporting production or manufacturing in the production area 12. In this regard, one or more alert devices 202 may be located at one or more global partners 20 that may be associated with the production area 12. Another alert controller module 150 may be coupled to an alert device 202 that may be located in an engineering 22 department. Additional alert controller modules 150 may be coupled to alert devices 202 located in a non-conformance tracking team 24 area or in a corrective action team 26 area. Another alert controller module 150 may be coupled to an alert device 202 that may be located within the production area 12. The location 160 of each one of the alert controller modules 150 may be provided to the alert routing module 100 upon registration of each alert controller module 150 as described above. For example, the IP address 162 (FIG. 7) and/or MAC address 164 (FIG. 7) of each alert device 202 may be indicative of a physical location (not shown) of each alert device 202.

Referring still to FIG. 6, upon sending an encrypted alert 56 via the Ethernet 18 or internet (not shown) or by other means, the alert routing module 100 may scan the registry 118 (FIG. 7) to determine which alert controller modules 150 are available. An available alert controller module 150 (FIG. 7) may decrypt the alert 56 using an encryption key 122 (FIG. 7) that may be issued to the alert controller module 150 upon registration of the alert controller module 150 with the registry 118. The encrypted alert 56 may be decrypted by the alert controller modules 150 and the decrypted alert 59 may be displayed on one or more display devices 202 (FIG. 7) to alert one or more recipients of the occurrence of an event 60 and optionally indicate the nature of the event 60. A visual signal (not shown) and/or an audible signal (not shown) may also be provided in locations or areas staffed with personnel (not shown) that may be supporting production activities in the production area 12.

The alert devices 202 (FIG. 7) may be implemented in any one of a variety of the above-described configurations 166 (FIG. 7) for alerting appropriate personnel of the occurrence of a manufacturing event (not shown) requiring attention. In response to the alert 56, appropriate personnel may review the alert content 58 (FIG. 7) provided by the alert devices 202 such that the nature of the manufacturing event may be determined. A potential solution (not shown) may be devised to resolve the manufacturing event in the production area 12.

Figure 7:
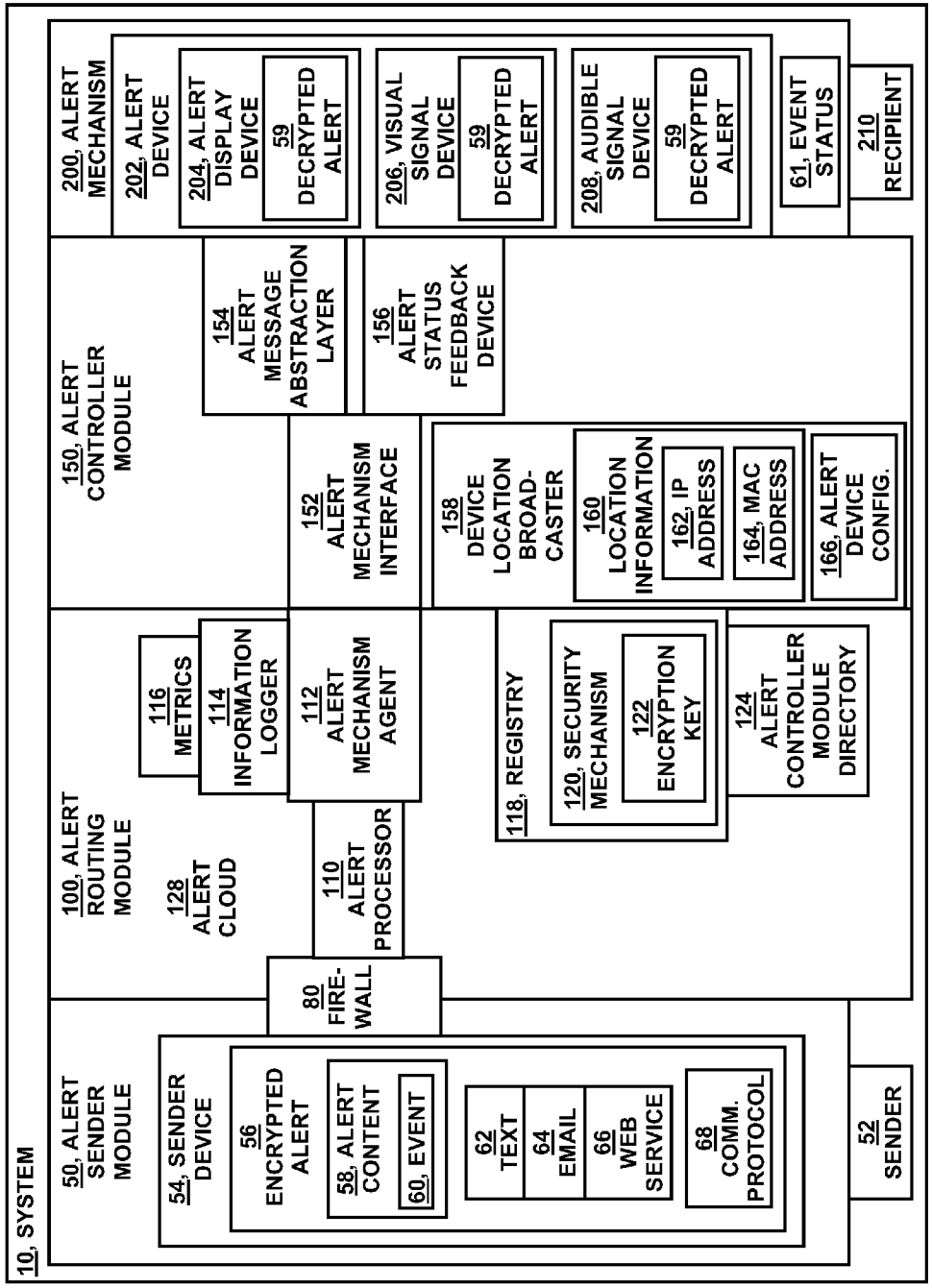
FIG. 7 is a block diagram of the alert system.
Figure 8:
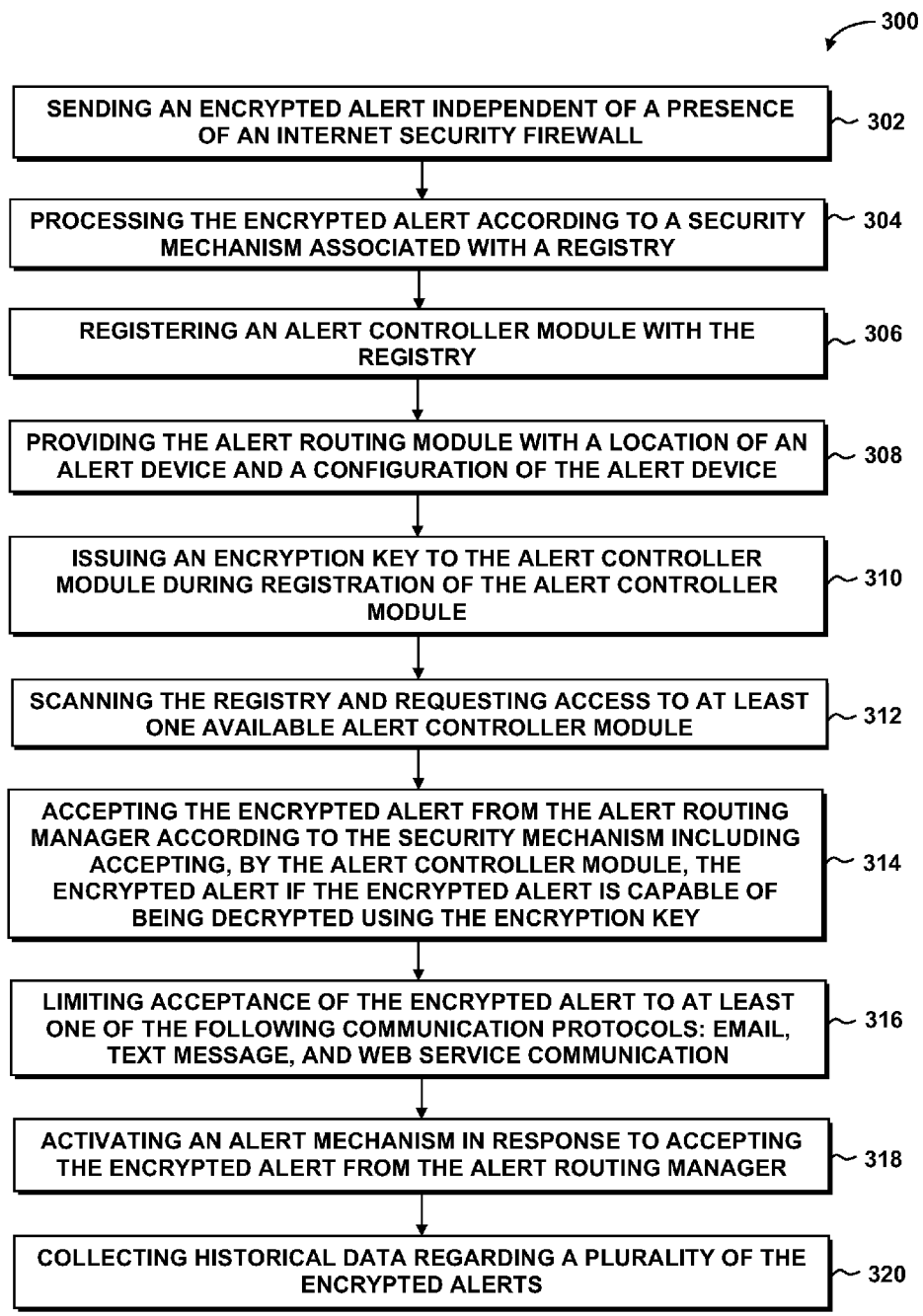
FIG. 8 is a flow chart illustrating one or more operations that may be included in a method of sending an alert.

Referring to FIGS. 7 and 8, shown in FIG. 8 is an embodiment of a method 300 of sending an alert 56 (FIG. 7) using a system 10 (FIG. 7) as illustrated in the block diagram of FIG. 7.

Step 302 of the method 300 of FIG. 8 may comprise generating an encrypted alert 56 (FIG. 7) and sending the alert 56 independent of the presence of an internet security firewall 80 (FIG. 7). The alert 56 may be generated regarding an event 60 (FIG. 7) such as a manufacturing event or a production issue. The alert 56 may be initiated for the purpose of alerting one or more recipients 210 (FIG. 7) of the event 60 so that the event 60 may be resolved in a timely manner. The alert 56 may be generated as an email 64 (FIG. 7), as a text message 62 (FIG. 7), as a web service 66 (FIG. 7) communication. However, the alert 56 may be generated as any standard communication protocol 68 (FIG. 7) that is not subject to restrictions associated with an internet security firewall 80 (FIG. 7). The encrypted alert 56 may be received at an alert processor 110 (FIG. 7) of the alert routing module 100 (FIG. 7).

Step 304 of the method 300 of FIG. 8 may comprise processing the encrypted alert 56 (FIG. 7) according to a security mechanism 120 (FIG. 7) associated with a registry 118 (FIG. 7). The security mechanism 120 may allow the encrypted alert 56 to be sent over the internet (not shown) in a secure manner. In this regard, the encrypted alert 56 may be sent by a sender 52 (FIG. 2) from a sender device 54 (FIG. 7) wherein the sender 52 may be authorized by means of the security mechanism 120.

Step 306 of the method 300 of FIG. 8 may comprise registering an alert controller module 150 (FIG. 7) with the registry 118 (FIG. 7) as part of the security mechanism 120 (FIG. 7). For example, the registry 118 may be communicatively coupled to an alert controller module directory 124 (FIG. 7). Upon bootup of the alert controller module 150 or at predetermined time intervals, the alert controller module 150 may register with the registry 118 of the alert routing module 100 (FIG. 7) such that an up-to-date listing of available alert controller modules 150 may be maintained in the registry 118 for later scanning by the alert routing module 100.

Step 308 of the method 300 of FIG. 8 may comprise providing the alert routing module 100 (FIG. 7) with the location 160 (FIG. 7) of the alert devices 202 (FIG. 7) when registering the alert controller module 150 (FIG. 7) with the registry 118 (FIG. 7). In this regard, the device location broadcaster 158 (FIG. 7) may provide the location 160 of the alert controller module 150 and alert devices 202 to the registry 118. The locations 160 of the alert devices 202 may be determined based on the IP addresses 162 (FIG. 7) and/or MAC addresses 164 (FIG. 7) of the alert devices 202. In addition, the device location broadcaster 158 may provide the configuration 166 (FIG. 7) or type of the alert mechanism 200 (FIG. 7) to the alert routing module 100 when the alert controller module 150 registers with the registry 118. By providing the locations 160 of the alert device 202 each time the alert controller module 150 registers with the registry 118, the system 10 (FIG. 7) provides flexibility for implementation in different facilities and allowing for re-configuring of the system 10 and maintaining communication with re-located alert devices 202. Due to the connection of the modules 50, 100, 150, 200 (FIG. 7) via the internet (not shown), the system 10 may be implemented at one or more of a variety of facilities at different locations throughout the world.

Step 310 of the method 300 of FIG. 8 may comprise issuing or assigning an encryption key 122 (FIG. 7) to the alert controller module 150 (FIG. 7) during registration of the alert controller module 150 (FIG. 7). The issuance or assignment of the encryption key 122 may comprise a part of the security mechanism 120 (FIG. 7) by which an unauthorized sender (not shown) is prevented from accessing the alert controller module 150 and activating or controlling the alert devices 202 (FIG. 7).

Step 312 of the method 300 of FIG. 8 may comprise scanning the registry 118 (FIG. 7) using the alert routing module 100 (FIG. 7). Upon receiving an alert 56 (FIG. 7) from a sender device 54 (FIG. 7), the alert routing module 100 may scan the registry 118 and request access to at least one available alert controller module 150 (FIG. 7). As indicated above, the registry 118 may be coupled to the alert controller module directory 124 (FIG. 7) which may contain a listing of available alert controller modules 150.

Step 314 of the method 300 of FIG. 8 may comprise accepting the encrypted alert 56 (FIG. 7) from the alert routing module 100 (FIG. 7) according to the security mechanism 120 (FIG. 7). In this regard, the acceptance of the encrypted alert 56 may include accepting, by the alert controller module 150 (FIG. 7), the encrypted alert 56 if the encrypted alert 56 is capable of being decrypted using the encryption key 122 (FIG. 7) issued by the alert routing module 100 during registration of the alert controller module 150.

Step 316 of the method 300 of FIG. 8 may comprise limiting acceptance of the encrypted alert 56 (FIG. 7) to a communication protocol 68 (FIG. 7) that is not subject to restriction by an internet security firewall 80 (FIG. 7) or otherwise prevented from passing through the internet security firewall 80. In this regard, acceptance of the encrypted alert 56 may be limited to emails 64 (FIG. 7), text messages 62 (FIG. 7), and web service 66 (FIG. 7) communications.

Step 318 of the method 300 of FIG. 8 may comprise activating an alert mechanism 200 (FIG. 7) in response to accepting the encrypted alert 56 (FIG. 7) from the alert routing module 100 (FIG. 7). The activation of an alert mechanism 200 may include activating and/or controlling one or more alert devices 202 (FIG. 7) that may be supported by the alert routing module 100. Activation and/or control of the alert devices 202 may be performed by an alert mechanism interface 152 (FIG. 7) of the alert controller module 150. In this regard, the alert mechanism interface 152 may receive an alert 56 from the alert mechanism agent 112 (FIG. 3). The alert mechanism interface 152 may directly control one or more alert devices 202 (FIG. 7) regardless of the type or configuration 166 (FIG. 7) of each alert device 202. For example, the alert mechanism interface 152 may directly control the alert devices 202 regardless of whether the alert devices 202 are configured as an alert display device 204 configured to display text (FIG. 7), illuminate a visual signal device 206 (FIG. 7), activate an audible signal device 208 (FIG. 7) to cause the emission of an audible signal (e.g., via a loudspeaker—not shown), or activate any one of a variety of other alert device 202 configurations 166, without limitation.

Step 320 of the method 300 of FIG. 8 may comprise collecting historical data 130 (FIG. 3) regarding a plurality of the encrypted alerts 56 (FIG. 7). The historical data 130 may be collected in the alert routing module 100 by the information logger 114 (FIG. 7). As mentioned above, the information logger 114 may store content 58 (FIG. 7) of the plurality of encrypted alerts 56 which may include data (e.g., time, date, and nature of event) associated with the encrypted alerts 56. Advantageously, metrics 116 (FIG. 7) may be generated from the historical data 130 collected by the information logger 114. Such metrics 116 may be analyzed for detecting trends or anomalies and to resolve issues such as manufacturing non-conformances.

Advantageously, the system 10 (FIG. 7) as disclosed herein provides a means for sending an alert 56 (FIG. 7) to appropriate personnel (e.g., recipients 210—FIG. 7) regarding the occurrence of an event 60 (FIG. 7) such as a manufacturing event or a production issue. Due to the registration process wherein the location 160 (FIG. 7) of alert devices 202 (FIG. 7) is updated when the alert controller module 150 (FIG. 7) is rebooted or at predetermined time intervals, the system 10 may be re-configured or expanded while maintaining communications between the alert controller module 150 and alert devices 202 regardless of whether the alert controller module 150 or alert devices 202 are added, deleted, or moved to different locations. Advantageously, flexibility is provided by the system 10 due to the capability of transmitting alerts 56 (FIG. 7) to one or more alert devices 202 without pre-knowledge by the sender 52 (FIG. 2) of the specific configuration or specific physical hardware of the alert device 202.

The system 10 (FIG. 7) may be implemented in a supply chain system (not shown) for providing parts (not shown) from a vendor (not shown) to one or more production or manufacturing facilities (not shown). The system 10 may also be implemented as a means to notify appropriate personnel (not shown) upon the occurrence of a manufacturing event (not shown) such that production support, engineering, inspection, quality control, and any one of a variety of other personnel may be alerted and informed of the nature and location of the event 60. In this regard, the system 10 may be implemented in a factory environment and/or between companies located anywhere in the world.

Figure 9:
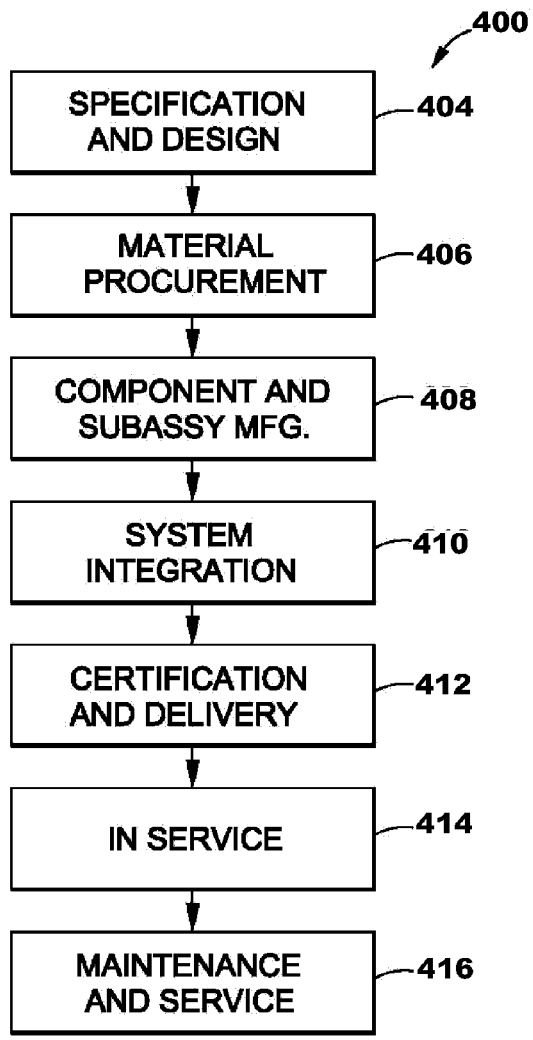
FIG. 9 is a flow diagram of an aircraft production and service methodology.
Figure 10:
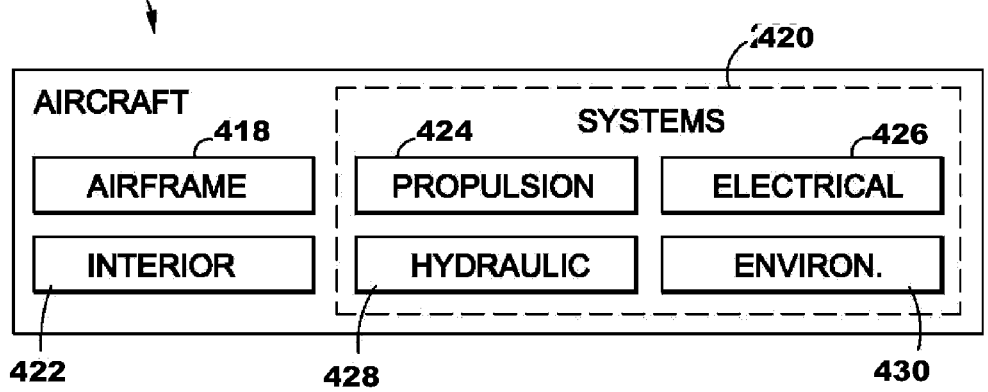
FIG. 10 is a block diagram of an aircraft.

Referring to FIGS. 9-10, embodiments of the disclosure may be described in the context of an aircraft manufacturing and service method 400 as shown in FIG. 9 and an aircraft 402 as shown in FIG. 10. During pre-production, exemplary method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 402 produced by exemplary method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Apparatus and methods embodied herein may be employed during any one or more of the stages of the production and service method 400. For example, components or subassemblies corresponding to production process 408 may be fabricated or manufactured in a manner similar to components or subassemblies produced while the aircraft 402 is in service. Also, one or more apparatus embodiments, method embodiments, or a combination thereof may be utilized during the production stages 408 and 410, for example, by substantially expediting assembly of or reducing the cost of an aircraft 402. Similarly, one or more of apparatus embodiments, method embodiments, or a combination thereof may be utilized while the aircraft 402 is in service, for example and without limitation, to maintenance and service 416.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An alert system, comprising:
an alert sender module configured to send an encrypted alert using a communication protocol that is not subject to restrictions associated with one or more internet security firewalls;
an alert routing module using a processor having a registry and being configured to receive the encrypted alert from the alert sender module regardless of the presence of the internet security firewall and process the encrypted alert according to a security mechanism associated with the registry;

an alert controller module having a processor configured to accept the encrypted alert from the alert routing module according to the security mechanism;

an alert mechanism having at least one alert device linked to the alert controller module;

the alert routing module configured to register in the registry a plurality of alert controller modules located at different locations, and select at least one alert controller module from the registry upon receiving the encrypted alert; and the selected alert controller module configured to decrypt the encrypted alert and control an alert device in response to the decrypted alert.

2. The system of claim 1, wherein the security mechanism comprises:

an encryption key issued by the alert routing module to the alert controller module upon registration of the alert controller module with the registry; and the alert controller module being configured to accept the encrypted alert if the encrypted alert is capable of being decrypted using the encryption key.

3. The system of claim 1, wherein:

the communication protocol comprises at least one of the following: email, text message, and web service.

4. The system of claim 1, wherein:

the alert routing module is configured to collect historical data regarding a plurality of events associated with a corresponding plurality of the alerts; and the alert routing module being configured to generate metrics of the events based upon the historical data.

5. The system of claim 1, wherein:

the alert controller module is configured to provide the alert routing module with at least one of the following:

a location of an alert device; and a configuration of the alert device.

6. The system of claim 5, wherein:

the alert controller module is configured to determine a location of the alert device based on at least one of an internet protocol address and a media access control address.

7. The system of claim 1, wherein the alert mechanism includes at least one alert device comprised of at least one of the following:

an alert display device;

a visual signal device; and an audible signal device.

8. The system of claim 1, wherein:

the alert routing module is configured to scan the registry and request access to at least one available alert controller module.

9. The system of claim 1, wherein:

the alert controller module is configured to limit acceptance of the encrypted alert to at least one of the following communication protocols: email, text message, and web service.

10. The system of claim 1, wherein:

the alert sender module includes a sender device configured to send the encrypted alert initiated by a sender for receipt by a recipient, the encrypted alert containing alert content regarding an event;

the alert routing module including an alert processor configured to receive the encrypted alert from the sender device and pass the encrypted alert to an alert mechanism agent;

the alert mechanism agent being communicatively coupled to an information logger for logging historical data associated with a plurality of the encrypted alerts;

the alert routing module functioning as a centralized alert cloud for registering a plurality of the alert controller modules located at different locations;

the alert controller module including an alert mechanism interface, an alert message abstraction layer communicatively coupled to the alert mechanism interface, an alert status feedback device communicatively coupled to the alert mechanism interface, and a device location broadcaster;

the alert mechanism interface being configured to receive the encrypted alert from the alert mechanism agent and decrypt the encrypted alert using am encryption key issued to the alert controller module by the registry;

the device location broadcaster being configured to provide location information to the registry regarding the location of the alert controller module and a plurality of alert devices linked to the alert controller module;

the alert message abstraction layer being configured to receive the decrypted alert from the alert mechanism interface and control at least one operating attribute of the alert devices;

the alert status feedback device being configured to indicate an event status of the event associated with the decrypted alert;

the alert devices being configured to receive the decrypted alert from the alert message abstraction layer; and the alert device being activatable and controllable by the alert controller module and being configured to display the alert content associated with the decrypted alert.

11. A method of sending an alert, comprising the steps of:

registering in a registry a plurality of alert controller modules located at different locations;

sending an encrypted alert from an alert sender module using a communication protocol that is not subject to restrictions associated with one or more internet security firewalls using a computer and/or a communication device;

receiving, at an alert routing module, the encrypted alert from the alert sender module regardless of the presence of an internet security firewall;

selecting an alert controller module from the registry upon receiving the encrypted alert at the alert routing module;

decrypting, at the selected alert controller module, the encrypted alert according to a security mechanism associated with the registry; and controlling, using the alert controller module, at least one alert device in response to the decrypted alert.

12. The method of claim 11 wherein the steps of registering the alert controller modules and decrypting the encrypted alert using the security mechanism includes:

issuing an encryption key to each one of the alert controller modules during registration of the alert controller modules; and accepting, by at least one of the alert controller modules, the encrypted alert if the encrypted alert is capable of being decrypted using the encryption key.

13. The method of claim 11 further comprising the step of:

providing the alert routing module with at least one of the following:

a location of an alert device; and a configuration of the alert device.

14. The method of claim 13 further comprising the step of:

determining a location of the alert device based on at least one of an internet protocol address and a media access control address.

15. The method of claim 11 wherein the step of selecting an alert controller module from the registry includes:

scanning the registry; and requesting access to at least one available alert controller module.

16. The method of claim 11 further comprising the steps of:

limiting acceptance of the encrypted alert to at least one of the following communication protocols: email, text message, and web service.

17. The method of claim 11 further comprising the steps of:

collecting historical data regarding a plurality of the encrypted alerts; and generating metrics based on the historical data.

18. The method of claim 11 further comprising the step of:

providing an event status of the alert.

* * * * *